Patented Sept. 2, 1941

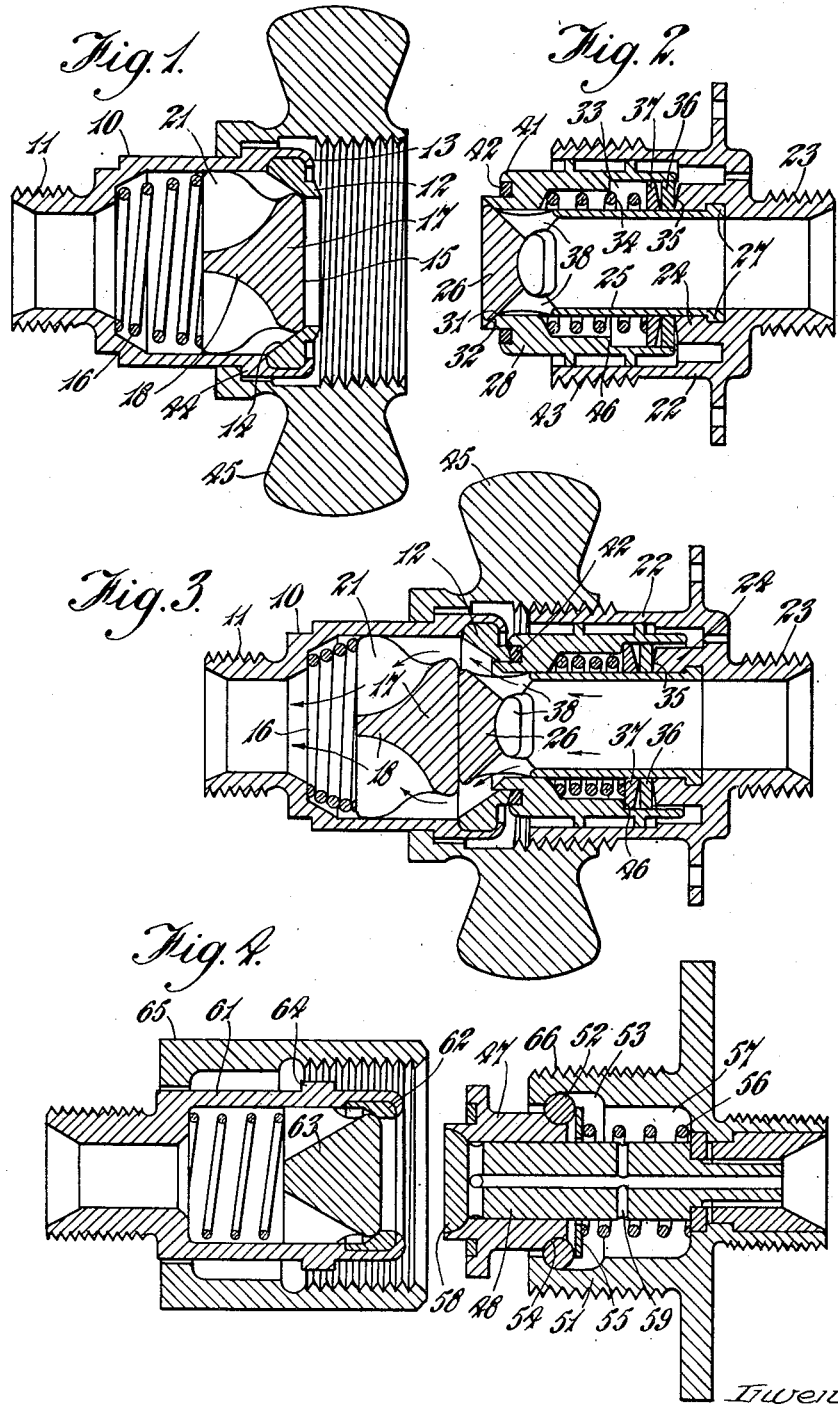

2,254,997

UNITED STATES PATENT OFFICE 2,254,997

PIPE COUPLING

Reginald John Fisher, London, England, assignor to Avery Equipment Limited, London, England, a British company Application November 2, 1939, Serial No. 302,586
In Great Britain December 10, 1938

7 Claims. (Cl. 284—19)

This invention relates to pipe couplings for connecting the ends of sections of piping, or for connecting a section of piping to a reservoir, cylinder or other unit. Couplings for this purpose have been proposed in which a valve provided in each part of the coupling closes automatically when the parts of the coupling are separated, and is opened by the connection of the coupling parts, so that fluid cannot escape from the ends of the pipes when the coupling parts are separated, but can flow freely through the coupling when the parts are connected, the valve in one coupling part being centrally disposed to engage an annular seating, and the valve in the other part being formed by an annular member co-operating with a central fixed seating, and each valve being engaged by the seating member of the other when the coupling is connected, and thereby unseated to open a passage through the coupling. The coupling, according to the present invention, is of the kind above described, which is mentioned hereafter as the type referred to.

The object of the invention is to provide a coupling which can be separated or connected whilst a pressure substantially above atmospheric pressure exists in either or both parts of the coupling without any leakage taking place during the separating or connecting operations, and in which a substantially smooth and uninterrupted passage for the fluid is provided through the coupling.

According to the invention, a pipe coupling of the kind referred to is characterised by the feature that the annular valve member is outside the fluid passage through the coupling, and has its rear face exposed at all times to the pressure in the coupling.

The pipe coupling may have the central valve seat formed on the end of a hollow stem forming the fluid passage through that part of the coupling, the annular valve member sliding on the exterior of the said stem, and the annular valve member may comprise an internally stepped sleeve with its largest internal diameter remote from the valve seat, the space thus formed between the hollow stem and the valve member being closed at its end by a sealing ring fixed relatively to the stem, and being in communication with the interior of the stem.

Alternatively, the sealing member may be provided between the exterior of the valve member and a sleeve forming the body of the coupling part.

In the accompanying drawing:

Figure 1 is a section through one part of a coupling according to the invention;

Figure 2 is a section through the other part of the coupling;

Figure 3 is a section of the coupling with the two parts brought together and the valves open; and Figure 4 is a section through another form of coupling according to the invention, the two parts of the coupling being slightly separated.

The coupling part shown in Figure 1 comprises a sleeve 10 having a thread 11 formed on one end for the attachment of a pipe union, and at the other end an inserted annular seating member 12 held in place by turning inwards the edge 13 of the sleeve 10, the seating member having a conical face 14 to form a seat for a valve member 15 slidable within the sleeve 10 and urged towards the seating face 14 by a spring 16. The valve member 15 has a head 17 of less diameter than the interior of the sleeve 10, and a body portion 18 which is a sliding fit in the sleeve, the body being cut away at 21 for the passage of fluid.

The other coupling part shown in Figure 2 also comprises a sleeve-like body 22 having a thread 23 to receive a pipe union, and an inner annular projection 24 forming an inner sleeve concentric with the main sleeve. A central hollow stem 25 formed at its end with a mushroom head 26 extends from the inner sleeve 24 through the outer sleeve, the stem being secured in the inner sleeve by a shoulder 27 formed on the stem 25 and expanded outwardly into a groove in the body 22. In the main sleeve-like body 22 is slidably mounted an annular valve member 28 having a frusto-conical surface 31 to engage with the part-spherical seating 32 on the mushroom head 26 of the stem 25.

The annular valve member 28 is a sliding fit on the stem 25 at its end adjacent the surface 31, but is internally stepped to provide an enlargement towards its other end thus forming a space 33 to receive a spring 34 tending to hold the valve member 28 up against its seat 32. The enlarged end of the valve member 28 is large enough to pass over the inner sleeve 24 of the body, which latter is provided at its end with a frusto-conical face 35 against which an annular packing member 36 of rectangular cross section and made of rubber, soft metal or other packing material is urged by a loose ring 37 which again has a frusto-conical face bearing on the packing 36, and is acted on at its other side by the valve spring 34 to thrust it against the packing. The conical faces of the sleeve 24 and ring 37 tend to thrust the packing outwardly against the interior wall of the annular valve member 28. The hollow stem 25 has one or more apertures 38 just behind the mushroom head 26, which connect with the passage through the stem. The annular valve member 28 is reduced in diameter exteriorly at its outer end to a diameter equal to that of the head 26, thus forming an external shoulder 41 which is recessed to receive a packing ring 42 upon which the coupling part 10 engages when the two parts are concerned. The coupling part 22 is screw threaded externally at 43, and the coupling part 10 is formed with an external collar 44 to be engaged by a winged cap nut 45 which may be screwed on to the thread 43 of the coupling part 22 to connect the two together.

When the coupling parts 10 and 22 are brought together, the reduced portion of the valve member 28 passes through the seating member 12 on the coupling part 10, and the end of the latter engages the packing ring 42 on the shoulder 41 of the said valve member, the head 26 on the hollow stem 25 engaging substantially simultaneously with the valve member 15 in the coupling part 10.

If the cap nut 45 is now screwed on to the coupling part 22, the two coupling parts are moved towards each other, and the two valve members 15, 28 are moved away from their seatings, since each is engaged by a fixed part of the other coupling part and the parts assume the positions shown in Figure 3. Fluid can then flow through the coupling by way of the hollow stem 25, apertures 38, and cut-away portions 21 in the valve member 15 of the coupling part 10. As the valve member 15 in the coupling part 10 abuts the head 26 before the valves begin to open, all air is excluded from between the two coupling parts, and none can be trapped and allowed to pass into the pipeline.

Fluid in the coupling part 22 can pass into the space 33 between the stem 25 and the valve member 28, but cannot escape from this space to the exterior of the coupling because of the packing ring 36 therein. The fluid in this space 33, if under pressure, therefore exerts a thrust which assists the spring 34 to retain the valve 28 in the closed position. The force due to the liquid pressure acting on any exposed area to move the valve towards its open position will act against the closing force. When the valve is closed the area upon which an opening force can act is substantially nil, unless due to slight differences of angle of the valve and its seating they are engaging at or near the outer edge only, but when the valve begins to open due to the bringing together of the coupling parts, a part of the external shoulder 41 is also exposed, the extent of the exposed area depending on the position of the circumferential line along which the seal takes place between the packing ring 42 on the shoulder 41 and the end of the first coupling part 10. The parts are so made that this circumferential line has a smaller radius than that of the largest part of the space 33 between the stem 25 and the annular valve member 28, so that during the connecting operation, as well as when the coupling parts are separated, that member is urged constantly towards its seat by the pressure in the coupling, and cannot be moved by the pressure away from its abutment on the coupling part 10, to allow leakage between them. The annular valve member is stepped internally to provide a shoulder 46 which, when the coupling parts are connected, engages the loose ring 37 bearing on the packing 36 and applies a positive (i. e. non-resilient) pressure to the packing ring. Alternatively, the loose ring may be of such diameter that the stepped part of the valve member passes over it and engages directly on the surface of the packing itself, the shoulder then being of frusto-conical form.

In the alternative form of coupling shown in Figure 4, the annular valve member 47 is similarly arranged between a central hollow stem 48 and the main sleeve or body 51 of the coupling part, but the valve member 47 is not enlarged internally, the packing ring 52 being arranged between it and the outer sleeve. The main sleeve 51 is formed with an internal annular recess 53, and the valve member is formed with a curved shoulder 54, the packing ring 52 lying between the recess and the curved shoulder, and being acted on through a washer 55 by a spring 56 in the space 57 between the stem and the sleeve. The spring 56 acts through the packing ring 52 to urge the valve towards its seat on the head 58 of the stem 48. Fluid from the interior of the coupling can enter the space 57 behind the packing ring and assist the spring 56 to hold the valve up against its seat.

The second coupling part of the coupling shown in Figure 4 is substantially identical with that shown in Figure 1, the body 61 being turned inwards at its end to secure in place a seating 62 on which engages a valve member 63, and the body 61 is formed with an external collar 64 to engage a cap nut 65 screwing on to a thread 66 on the coupling part 51.

The fluid from the interior of the couplings enters the space 33 (Figures 1 to 3) or 57 (Figure 4) by passing between the stem and the valve member, the fit of the surfaces of these allowing sufficient passage of fluid to maintain a pressure in the packing space. If desired, ports may be formed in the wall of the hollow stem as shown at 59 in Figure 4 to provide a more free communication, but this is not normally essential.

By the present invention, there is provided a coupling, the parts of which can be separated, left apart, and recoupled with pressures substantially above atmospheric pressure existing in both parts of the coupling, without any appreciable leakage of fluid taking place, any pressure in either part of the coupling assisting the tightness of the seal.

What I claim is:

1. A pipe coupling comprising two coupling parts to be brought into end to end engagement, an annular seating member in one of said engaging ends, a central valve body cooperating with said seating member, a fixed head forming the center of the other engaging member, a tubular support for said head, an annular valve member surrounding said head and slidable externally on said tubular support, said annular valve member bounding at one end an annular space around said tubular support, and means for admitting fluid from the coupling to said annular space to apply pressure to said valve member and urge it towards its seat, the engaging ends of the coupling parts being of substantially exact complementary form when the valves are closed, whereby they may be brought into close abutment relationship over their whole surfaces, and the coupling parts subsequently moved toward each other to produce an opening of the valves.

2. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member comprising an internally stepped sleeve with its largest internal diameter remote from the head, a sealing ring between the tubular support and the largest internal diameter of said sleeve, an abutment for said sealing ring on the tubular support, and means for admitting fluid from the coupling to the annular space between the valve member and the tubular support to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

3. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member comprising an internally stepped sleeve with its largest internal diameter remote from the head, a sealing ring between the tubular support and the largest internal diameter of said sleeve, an abutment for said sealing ring on the tubular support, a loose ring engaging the sealing ring on the side opposite to the abutment, and a spring taking its abutment on the valve member and acting to urge the loose ring against the seal, means being provided for admitting fluid from the coupling to the annular space between the valve member and the tubular support to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

4. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member comprising an internally stepped sleeve with its largest internal diameter remote from the head, a sealing ring between the tubular support and the largest internal diameter of said sleeve, an abutment for said sealing ring on the tubular support, a loose ring engaging the sealing ring on the side opposite to the abutment, and a spring taking its abutment on the valve member and acting to urge the loose ring against the seal, the abutment for the sealing ring and the loose ring having radially outwardly divergent faces engaging the sealing ring, whereby the said ring is urged outwardly into engagement with the annular valve member, and means for admitting fluid from the coupling to the annular space between the valve member and the tubular support to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

5. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member comprising an internally stepped sleeve with its largest internal diameter remote from the head, a sealing ring between the tubular support and the largest internal diameter of said sleeve, an abutment for said sealing ring on the tubular support, a loose ring engaging the sealing ring on the side opposite to the abutment, and a spring taking its abutment on the valve member and acting to urge the loose ring against the seal, the abutment for the sealing ring and the loose ring having radially outwardly divergent faces engaging the sealing ring, whereby the said ring is urged outwardly into engagement with the annular valve member, an intermediate step in the bore of the stepped sleeve adapted to engage the loose ring when the coupling parts are fully coupled and apply pressure to the sealing ring, and means for admitting fluid from the coupling to the annular space between the valve member and the tubular support to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

6. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member bounding at one end an annular space around said tubular support, an outer sleeve concentric with the tubular support and in which said tubular support is rigidly attached, an internal circumferential groove in said outer sleeve, a shoulder in said annnular valve member, a sealing ring lying in said circumferential groove and engaging said shoulder, and means for admitting fluid from the coupling to said annular space to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

7. A pipe coupling comprising two coupling parts designed for end to end engagement, an annular seating member in one of the engaging ends, a central valve body co-operating with said seating, a fixed head forming the center of the other engaging end, a tubular support for said head, an annular valve member surrounding said head and slidable externally on said tubular support, said annular valve member bounding at one end an annular space around said tubular support, an outer sleeve concentric with the tubular support and in which said tubular support is rigidly attached, an internal circumferential groove in said outer sleeve, a shoulder in said annular valve member, a sealing ring lying in said circumferential groove and engaging said shoulder, a retaining washer, a spring urging said retaining washer against the sealing ring and thereby urging the latter against the shoulder on the valve member, and means for admitting fluid from the coupling to said annular space to apply pressure to said valve member and urge it towards its seat, the engaging ends of the coupling parts being of substantially exact complementary form when the valves are closed, whereby they may be brought into close abutting relationship over their whole surfaces and the coupling parts subsequently moved towards each other to produce the opening of the valves.

REGINALD JOHN FISHER.